United States Patent
Michioka et al.

[11] Patent Number: 5,230,664
[45] Date of Patent: Jul. 27, 1993

[54] LUBRICATING SYSTEM FOR AUTOMATIC TRANSMISSION

[75] Inventors: Hirofumi Michioka; Yuji Hayashi; Koichi Hayasaki, all of Kanagawa, Japan

[73] Assignee: Nissan Motor Co., Ltd., Yokohama, Japan

[21] Appl. No.: 917,232

[22] Filed: Jul. 23, 1992

[30] Foreign Application Priority Data

Jul. 26, 1991 [JP] Japan ................................. 3-208855

[51] Int. Cl.$^5$ ............................................ F16H 57/04
[52] U.S. Cl. ...................................................... 474/43
[58] Field of Search ................................... 474/43–45, 474/91, 93, 28

[56] References Cited

U.S. PATENT DOCUMENTS

| | | | |
|---|---|---|---|
| 3,044,316 | 7/1962 | Forster | 474/43 X |
| 4,820,243 | 4/1989 | Fub | 474/43 |
| 4,935,872 | 6/1990 | Benford et al. | |

FOREIGN PATENT DOCUMENTS

63-235728  9/1988  Japan.
1-80853  5/1989  Japan.

OTHER PUBLICATIONS

"Nissan Repair Manual, Nissan Automatic Transaxle RL4F03A Type", pp. A-1 to A-38, May 1989.
Nissan Repair Manual (L4N71B and E4N71B), 1982, p. 7.
Toyota Repair Manual (A340E), 1985.
Toyota Repair Manual (A540H).
Jaguar XJ6 Repair Manual (ZF4HP-22), p. 44-2.

*Primary Examiner*—Thuy M. Bui
*Attorney, Agent, or Firm*—Foley & Lardner

[57] ABSTRACT

A lubricating system which is for an automatic transmission having planetary gear sets and producing various speeds by selectively engaging friction elements. The lubricating system is provided with a first lubricating circuit which usually supplies lubricant to planetary gear sets, bearings and the like, and a second lubricating circuit which supplies lubricant to friction elements during a shift.

10 Claims, 6 Drawing Sheets

LUBRICATING SYSTEM FOR AUTOMATIC TRANSMISSION

BACKGROUND OF THE INVENTION

1. Field of the Invention

The present invention relates to improvements in a lubricating system for an automatic transmission, and more particularly to a lubricating system which efficiently supplies lubricating oil to elements of an automatic transmission.

2. Description of the Prior Art

It is well known that automatic transmissions for automotive vehicles are provided with lubricating systems therein for lubricating elements of the automatic transmission such as gears, bearings and friction elements. Such a lubricating system is disclosed, for example, in Japanese Utility Model Provisional Publication No.1-80853 and on pages A-1 to A-38 of a service manual "NISSAN AUTOMATIC TRANS-AXLE RL4F03A TYPE" published in May 1989. In these conventional lubricating systems, lubricant pressurized by an oil pump is fed to a main passage formed inside of input and output shafts through a control valve assembly, and supplied outwardly to elements of the transmission.

However, with these conventional system, lubricant is simultaneously and usually supplied to planetary gear sets, bearings and friction elements. Although the planetary gear sets and bearings need to be usually lubricated, the friction elements may only require lubrication during a shift. Accordingly, it is not effective to usually supply lubricant to the friction elements since the oil pump is excessively operated and the power loss due to the stirring loss of the friction element is generated.

SUMMARY OF THE INVENTION

It is an object of the present invention to provide an improved lubricating system by which an automatic transmission is efficiently lubricated so as to be free of the above-mentioned drawbacks.

A lubricating system according to the present invention is for an automatic transmission having a first element which needs to be usually lubricated and a second element which needs to be lubricated during a shift. The lubricating system comprises a first lubricating circuit which usually supplies lubricant to the first transmission element, and a second lubricating circuit which supplies lubricant to the second transmission element during the shift.

With this arrangement, the friction element is suitably lubricated while the stirring loss of the friction elements are lowered. Therefore, the lubricating efficiency is kept at a suitable level even during the shift with the engagement or disengagement of the brakes.

DETAILED DESCRIPTION OF THE INVENTION

Referring now to FIGS. 1 to 6, there is shown an embodiment of a lubricating system in an automatic transmission for an automotive vehicle according to the present invention.

Figure 2:
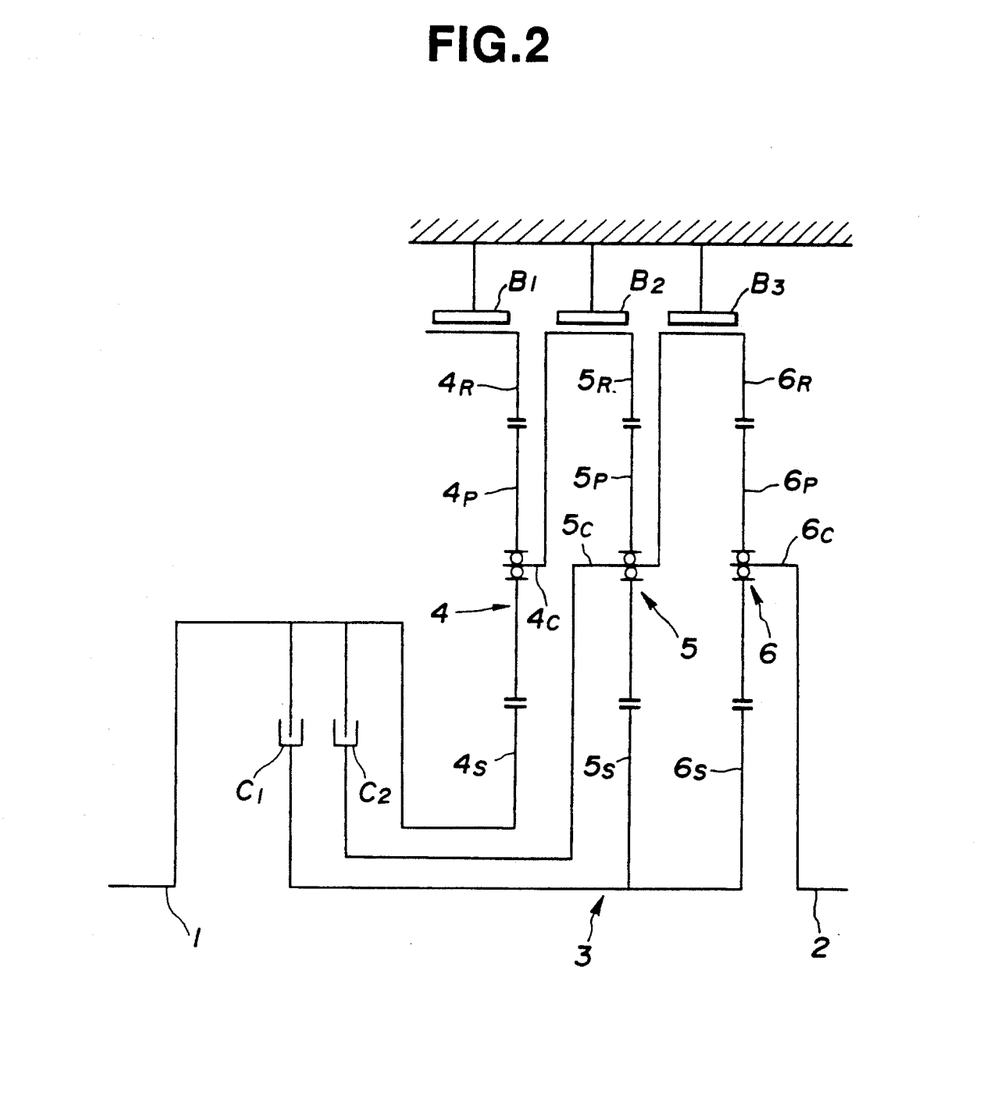
FIG. 2 is a schematic diagram of the automatic transmission to which the lubricating system according to the present invention is applied.

As shown in FIG. 2, an input shaft 1, an intermediate shaft 3 and an output shaft 2 are coaxially aligned in a straight line. The intermediate shaft 3 is placed between the input shaft 1 and the output shaft 2. A transmission gear system is concentrically arranged around the shafts 1, 2 and 3. The transmission gear system includes a first planetary gear set 4, a second planetary gear set 5 and a third planetary gear set 6. The first planetary gear set 4 includes a first sun gear 4S, a first ring gear 4R, a first pinion 4P engaged with the first sun gear 4S and the first ring gear 4R, and a first carrier 4C rotatably supporting the first pinion 4P. Similarly, the second planetary gear set 5 includes a second sun gear 5S, a second ring gear 4R, a second pinion 4P and a second carrier 5C. The third planetary gear set 6 includes a third sun gear 6S, a third ring gear 6R, a third pinion 6P and a third carrier 6C.

The input shaft 1 is connected to the first sun gear 4S. The second and third sun gears 5S and 6S are drivingly connected to the input shaft 1 through a first clutch C1. The second carrier 5C is drivingly connected to the input shaft 1 through a second clutch C2. A first brake (band brake) B1 is engageable to anchor the first ring gear 4R. A second brake B2 is engageable to anchor the first carrier 4C and the second ring gear 5R. A third brake B3 is engageable to anchor the second carrier 5C and the third ring gear 6R. The third carrier 6C is always connected to the output shaft 2.

The transmission gear system produces the five forward speeds and one reverse gear by selectively engaging the aforementioned clutches and brakes as shown in the following Table.

TABLE 1

| GEAR | FRICTION ELEMENTS | | | | |
|---|---|---|---|---|---|
| | C1 | C2 | B1 | B2 | B3 |
| 1 | ○ | | | | ○ |
| 2 | ○ | | | ○ | |
| 3 | ○ | | ○ | | |
| 4 | ○ | ○ | | | |
| 5 | | ○ | | ○ | |
| R | | | | ○ | ○ |

○—Engagement

Figure 1:
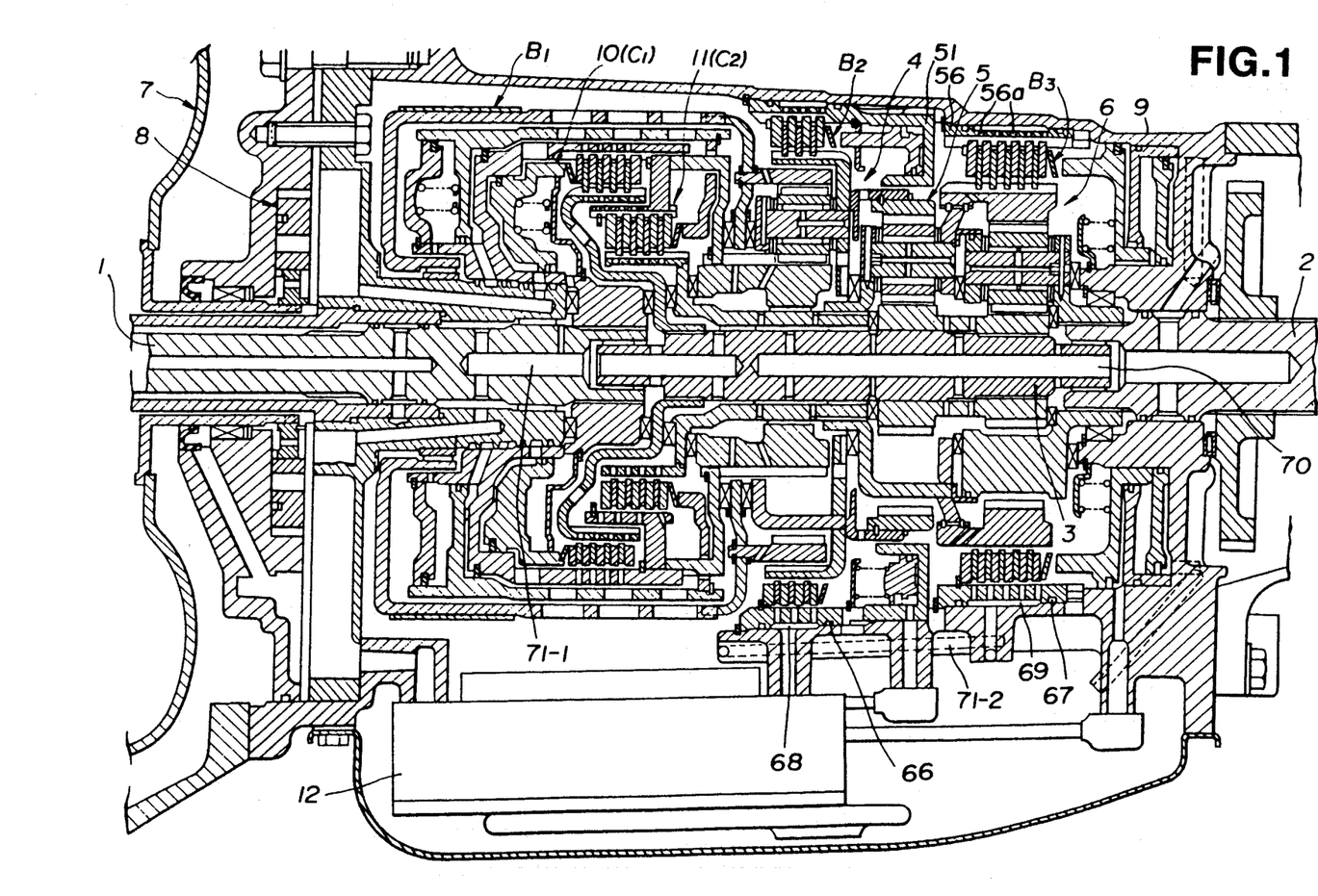
FIG. 1 is a cross-sectional view of an embodiment of a lubricating system of an automatic transmission according to the present invention.
Figure 3:
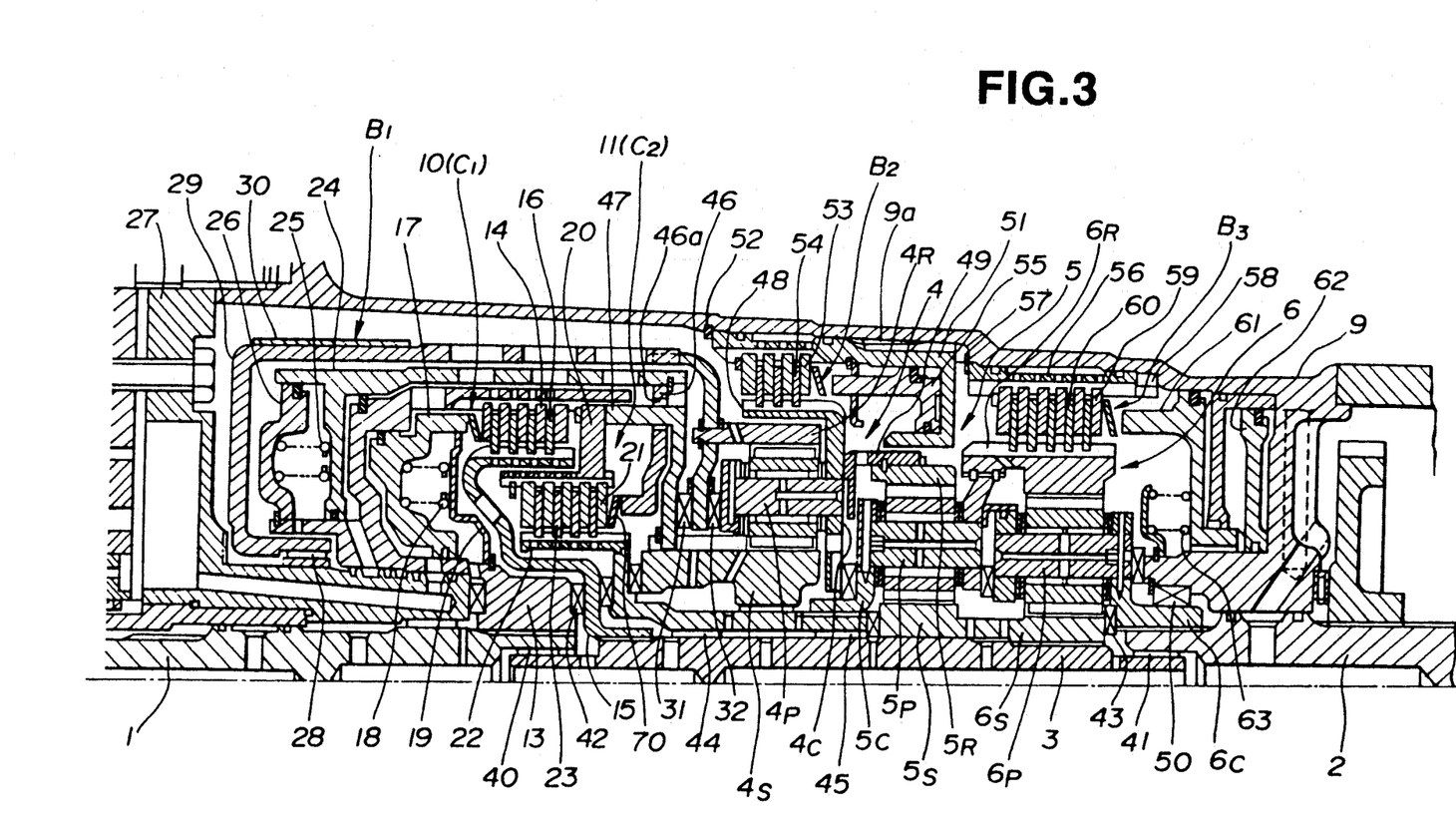
FIG. 3 is an enlarged partial cross-sectional view of FIG. 1.

As shown in FIG. 1, the input, output and intermediate shafts 1, 2 and 3 are arranged to axially penetrate a central portion of the automatic transmission. A torque converter 7 receives a rotating energy from an engine (now shown) and transmits the energy to the input shaft 1. An oil pump 8 is disposed around a middle portion of the input shaft 1. A clutch pack (no numeral) is constituted by first and second clutches 10 and 11 of FIG. 1 corresponding to the first and second clutches C1 and C2 of FIG. 2. The clutch pack and the first brake (band brake) B1 are located in the vicinity of the right hand side of the input shaft 1 as shown in FIG. 1. An output side end of the input shaft 1 (an end of the right hand side of the input shaft 1 in FIG. 1) rotatably supports the intermediate shaft 3. The first, second and third planetary gear sets 4, 5 and 6 are arranged around the intermediate shaft 3 in the order of the reference numeral as shown in FIG. 3. The second and third brake B2 and B3 are located around the outer peripheries of these planetary gear sets 4, 5 and 6. An input end of the output shaft 2 (An end of the left hand side of the output shaft 2 in FIG. 1) is rotatably connected to the intermediate shaft 3. Pistons 61 and 62 and a supporting wall of the third brake B3 are located around the output shaft 2. A casing 9 covers the transmission gear system. A control valve assembly 12 is disposed at a lower portion of the outer periphery of the first brake B1 and supplies hydraulic fluid to each hydraulic passage (including lubricating passages). The control valve assembly 12 is arranged to modify hydraulic pressure from the oil pump 8 according to various operating conditions.

As shown in FIG. 3, the first clutch 10 corresponding to the first clutch C1 of FIG. 2 includes a clutch drum 13 splined to the input shaft 1. A plurality of outer clutch plates 14 are connected to the clutch drum 13. A plurality of inner clutch plates 16 are disposed between the outer clutch plates 14 and connected to a rotating member 15. A piston 17 is arranged to put the first clutch 10 into an engagement during the hydraulic operating state in a manner to push the outer and inner clutch plates 14 and 16. A spring 18 is arranged to bias the piston 17 in a disengaged direction and is supported by a retainer 19. The second clutch 11 corresponding to the first clutch C2 of FIG. 2 includes a clutch drum 20 splined to the clutch drum 13. A plurality of outer clutch plates 21 are connected to the clutch drum 20. A plurality of inner clutch plates 23 are disposed between the outer clutch plates 21, respectively, and connected to a rotating member 22. A piston 24 is arranged to put the second clutch 11 into an engagement during the hydraulic operating state by pushing the first and second clutch plates 21 and 23. A spring 25 is arranged to bias the piston 24 in a disengaged direction and is supported by a member 26 which defines a camber generating centrifugal hydraulic pressure thereinside. The first brake (band brake) B1 includes a brake drum 29 whose one end is supported to a supporting wall 27 of the input shaft 1 through a bearing 28. A brake band 30 is installed to an outer peripheral portion of the brake drum 29 outside of the piston 24. The other end of the brake drum 29 is supported to bearings 31 and 32. In order to reduce the number of friction elements disposed around the intermediate shaft 3 and to facilitate the layout of the gear sets 4, 5 and 6, the clutches 10 and 11 and the first brake B1 are arranged around the input shaft 1. Thus, in this embodiment, three in five elements are disposed around the input shaft 1.

An input side end portion of the intermediate shaft 3 (an end of the left hand side of the intermediate shaft 3 in FIG. 3) is supported to the input shaft 1 through a bearing 40. The other end portion of the intermediate shaft 3 is supported to the output shaft 2 through a bearing 41. As shown in FIG. 3, the right hand side of the rotating member 15 is splined to the left end portion of the intermediate shaft 3. The input side portion of the intermediate shaft 3 is supported through the rotating member 15 and the bearing 42 to the clutch drum 13 disposed around the input shaft 1. The other end portion of the intermediate shaft 3 is supported through the bearing 43 to the third sun gear 6S disposed around the output shaft 2. The rotating member 22 splined to the second carrier 5C is rotatably supported to the intermediate shaft 3 through bearings 44 and 45. The second and third sun gears 5S and 6S are integrally formed and splined to the intermediate shaft 3. The first sun gear 4S is connected to the rotating member 47 penetrating a hole 46a of the brake drum 29. The first carrier 4C is connected to a brake hub 48 of the brake B2 and connected to the second ring gear 5R through a member 49. The second carrier 5C is connected at its one end portion to the third ring gear 6R and splined at its other end portion to the rotating member 22. The third carrier 6C is splined on the output shaft 2 and supported on the casing 9 through a bearing 50.

A brake drum 51 of the second brake B2 is disposed around the outer peripheries of the first and second planetary gear sets 4 and 5 and fixedly engaged with the casing 9 by means of teeth 9a installed on the casing 9. A plurality of outer brake plates 53 are connected to the brake drum 51, and a brake hub 48 of the second brake B2 is connected to a plurality of inner brake plates 54 correspondingly arranged to the outer brake plates 53. A piston 55 is slidably supported to the brake drum 51 so as to move to the left hand side in FIG. 3 against a biasing force of a spring (now shown).

A brake drum 56 of the third brake B3 is disposed around the outer periphery of the third planetary gear set 6 and fixedly engaged with a part of the casing 9 by means of a snap ring 57 and a whirl-stop (or detent) 58. A plurality of outer brake plates 59 are connected to the brake drum 56. A plurality of inner brake plates 60 are disposed corresponding to the outer brake plates 59 and connected to the third ring gear 6R which is also used for a brake hub. The pistons 61 and 62 of the second brake B3 are separated from the brake drum 56 and slidably supported in the space defined by the casing 9 located above the output shaft 2. The pistons 61 and 62 are arranged to move to the left hand side in FIG. 3 against the biasing force of the spring 63 during the braking operation of the brake B3. That is to say, the brake B3 is of a double piston structure.

The lubricating system includes first and second lubricating circuits 70 and 71 which are independent from each other, as shown in FIGS. 1 and 3. The first lubricating circuit 70 is arranged to feed lubricant to the first, second and third planetary gear sets 4, 5 and 6 and bearings near the gear sets through oil passages formed inside of the output shaft 2 and the intermediate shaft 3. Then, the lubricant is supplied to the brake plates of the brakes B2 and B3 through the inside portion of the gear sets. The second lubricating circuit 71 is constituted by first and second lubricating lines 71-1 and 71-2 which are in communication with each other. The first lubricating line 71-1 is arranged to feed lubricant to the first and second clutches C1 and C2 and the bearings located near them, and to lead the lubricant to the first brake B1. The second lubricating line 71-2 is arranged to feed lubricant to the brake plates of the second and third brakes B2 and B3 through the holes of the brake drums 51 and 56. That is, the lubricant is supplied from outside to inside relative to the axis of the automatic transmission. The lubricant pressurized by the oil pump 8 is controlled in pressure by the control valve assembly 12 and supplied to the first and second lubricating circuits 70 and 71.

The second and third brake drums 51 and 56 are engaged with the casing 9 and define oil chambers 68 and 69, respectively, as shown in FIG. 1. The second and third brake drums 51 and 56 are provided respectively with a plurality of holes 51a and 56a which are formed at the same intervals in the circular and axial directions relative to the shaft of the automatic transmission.

The oil chambers 68 and 69 are communicated with the control valve assembly 12 so that lubricant is supplied to them through the second lubricating line 71-2. The lubricant fed to the oil chambers 68 and 69 is supplied to the brake plates of the second and third brakes B2 and B3 through the holes 51a and 56a. The second lubricating circuit 71 is arranged to supply a predetermined amount of lubricant which is determined on the basis of the necessity of the friction elements. On the other hand, the first lubricating circuit 70 is arranged to supply a predetermined amount of lubricant which is determined on the basis of the necessity of the planetary gear sets.

Figure 4:
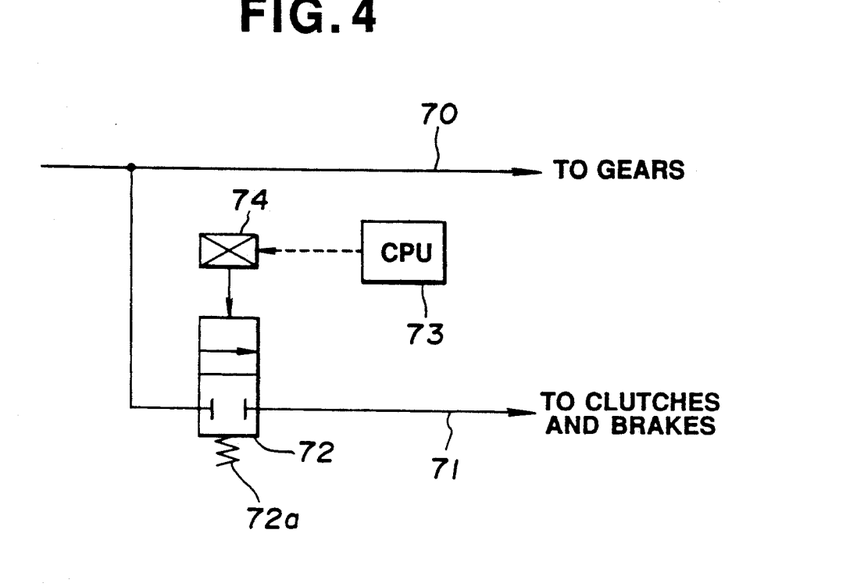
FIG. 4 is a schematic diagram showing a structure of a lubricant amount control system applied to the embodiment of FIG. 1.

A lubricant amount control system in this automatic transmission includes a lube boost valve 72 disposed in the control valve assembly 12. The lube boost valve 72 is disposed upstream of the second lubricating circuit 71. As shown in FIG. 4, a first predetermined amount of lubricant such as 3 l/hour is constantly supplied to the gear sets 4, 5, and 6 through the first lubricating circuit 70 without being controlled by the lubricant amount control system. On the other hand, since the lubricant supplied to the clutches and brakes passes through the lube boost valve 72, the amount of the lubricant is controlled to be supplied only during the shift of the automatic transmission. That is to say, the manner of operation of the lubricant amount control system is shown in FIGS. 5 and 6.

Figure 5:
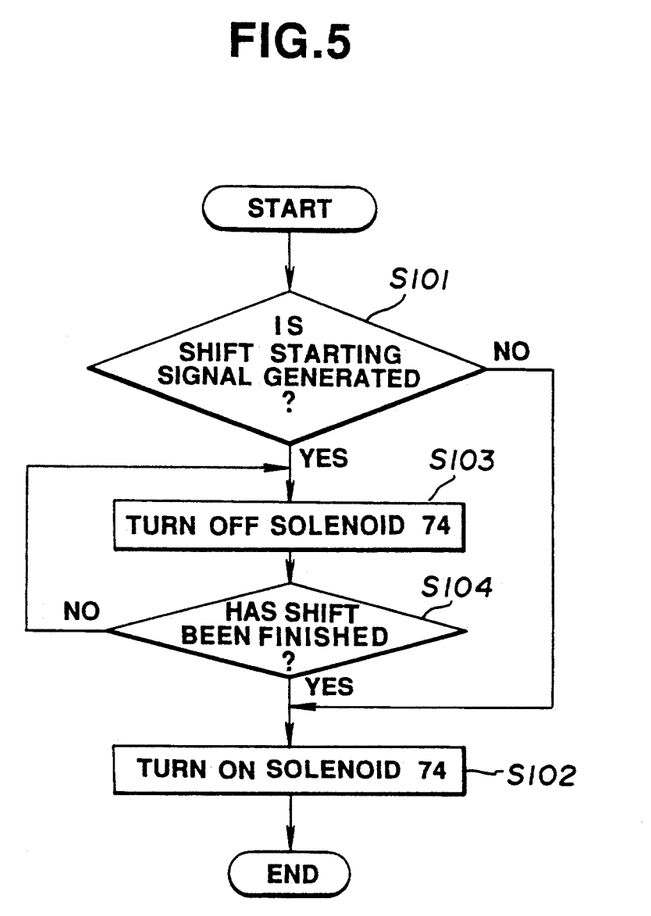
FIG. 5 is a flow-chart which shows a control procedure of the lubricant amount control system of FIG. 4.

As shown in FIG. 5, at a step S101 it is judged whether a shift start signal is generated or not. When the automotive vehicle is driven without shift, the program proceeds to a step S102 wherein a solenoid 74 is turned ON. With this ON operation of the solenoid 74, a ball for shutting off a drain passage is moved from a shut-off position. Accordingly, the lubricant is drained without being supplied to the lube boost valve 72. Furthermore, the lube boost valve 72 of the hydraulic operating type is set to cut the supplement of the lubricant to the second lubricating circuit 71 due to a biasing force of the spring 72a, as shown in FIG. 4. Therefore, the lubricant is not supplied to the clutches C1, C2 and the brakes B1, B2, B3. Accordingly, the total amount of the supplied lubricant in the automatic transmission is suppressed only to be supplied to the first, second and third planetary gear sets 4, 5 and 6. For example, in this embodiment the amount of the lubricant is suppressed at 3 l/hour. This largely improves the efficiency of the lubricant usage. Therefore, the stirring loss of the clutches and brakes are lowered.

Figure 6:
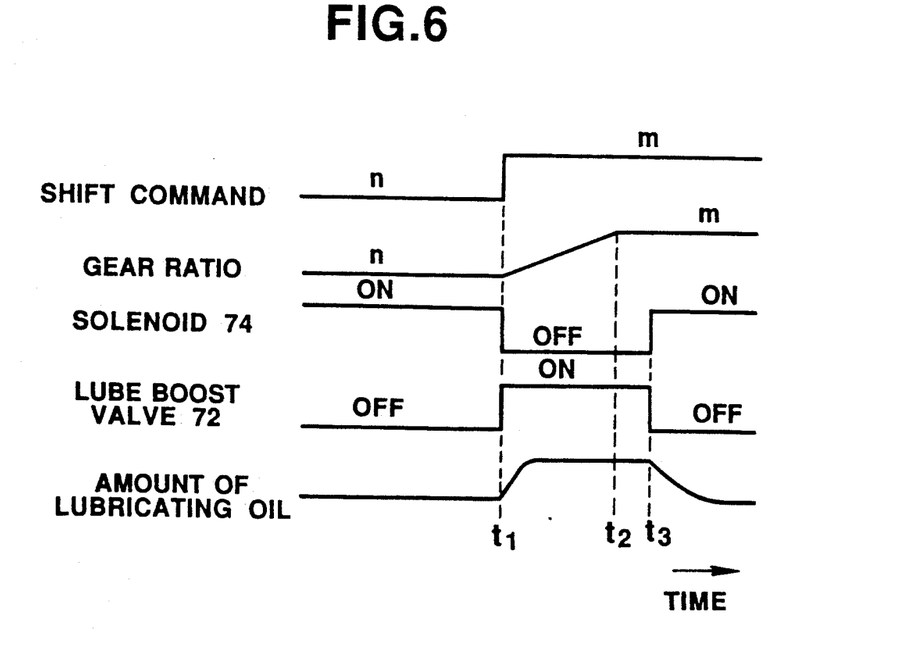
FIG. 6 is a time chart during a shift.

During the shift, when the CPU 73 outputs a command to change the gear ratio from n to m at a moment t1 as shown in FIG. 6, at the step S101 it is judged that the shift start signal is generated. Accordingly, the program of FIG. 5 proceeds from the step S101 to a step S103 where the solenoid 74 is turned OFF. With this OFF operation of the solenoid 74, the ball for shutting-out the drain passage is positioned at a shut-off position. Accordingly, the lubricant is supplied to the lube boost valve 72 without being drained through the drain passage. Following this, at a step S104 it is judged whether the shift has been finished or not. When the shift has been finished, the program proceeds to a step S102. When the shift has not been finished, the program is returned to the step S103 in order to repeat the operation in the step S103 until the shift has been finished. Practically, the judgement at the step S102 is carried out in the CPU 73 on the basis of signals indicative of driving conditions of the vehicle utilizing commonly known method. Additionally, since the judgement is carried out at a moment t3 after the shifting time period from a moment t1 to a moment t2 as shown in FIG. 6, a second predetermined amount of the lubricant is certainly supplied to the clutches and the brakes during the shift as shown in FIG. 6. For example, the second predetermined amount of the lubricant is 3 l/hour in this embodiment. Accordingly, the durability of the clutches and brakes are improved by such lubrication. The structure of the lubricant amount control system according to the present invention is of a fail safe structure so as to supply lubricant to the clutches and brakes even if the solenoid 74 goes wrong.

After the shift, the lube boost valve 72 is turned ON at the step S102, and the lube boost valve 72 is set in the condition of FIG. 4. Accordingly, the lubricant amount is radically decreased after the moment t3 and becomes stable at a condition similar to the condition before the shift, as shown in FIG. 6.

Figure 7:
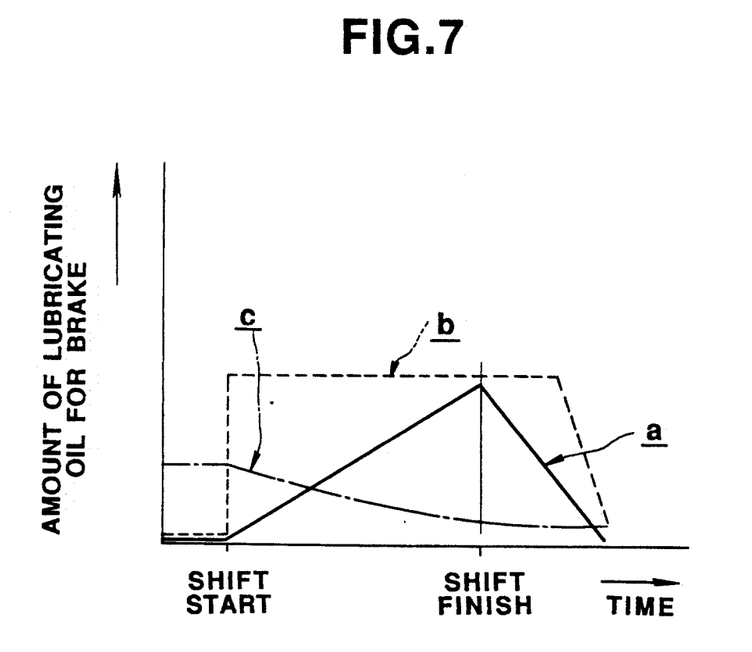
FIG. 7 is a graph showing the characteristics of the lubricating system according to the present invention.

As shown in FIG. 7, the characteristics of the lubricant supply amount the system according to the present invention is compared with that of a conventional system. In general, the necessary amount of the lubricant for lubricating the brakes is represented by a continuous line a in FIG. 7. That is to say, the necessary amount of the lubricant is radically increased from the moment of a shift start point and reaches a peak value at a moment of the shift finish point. Then, the necessary amount of lubricant is radically decreased.

In the case of a conventional lubricating system applied an the automatic transmission, if an automatic transmission is in a shift with an engagement of at least one of brakes B1, B2 and B3, the characteristics of the conventional lubricating system is represented by a dashed line c as shown in FIG. 7. That is to say, the lubricant amount supplied to the outer peripheral portion of the brake is gradually decreased and converged into a generally predetermined value since the degradation of the lubricating efficiency is caused by a decreasing of the relative rotating speed of the friction elements in proportion to the proceeding of the shift. Accordingly, with the conventional lubricating system, the largest lubricant deficiency occurs at the shift finish time since this is the point at which the necessary maximum lubricant amount is required. This causes a problem that the durability of the automatic transmission is degraded due to the poor lubrication. If on the other hand the lubricant amount being supplied to the friction elements is set to satisfy the necessary amount required during the entire shift in the conventional system, too much lubricant is supplied during a non- shifting period and therefore the loss of the energy and the friction loss are increased. Since the necessary amount of lubricant during the shift with the disengagement of the brakes or without the change of the engagement of the brakes is lower than that during the shift with the engagement of the brakes, the lubricant amount supplied to the brakes must be determined on the basis of the necessary lubricant amount needed during a shift with the engagement of the brakes.

On the other hand, with the lubricating system according to the present invention, the lubricant is supplied to the brakes as represented by the dotted line b in FIG. 7. That is to say, during the shift (from the start of the shift to the end of the shift) and a time period from the end of the shift to a moment shortly after the end of the shift, a predetermined amount of lubricant, which is greater than a peak value of the necessary amount of lubricant, is supplied to the brakes. Accordingly, the stirring loss of the clutches and brakes are lowered. Therefore, the lubricating efficiency is kept at a suitable level even during a shift with the engagement or disengagement of the brakes.

Although the lubricant control program shown in FIG. 5 has been shown and described so as not to include a step between the steps S104 and S102, it will be understood that a step for counting a predetermined time may be added between the steps S104 and S102.

While the embodiment of the present invention has been shown and described so that the supply of the lubricant to the clutches and brakes are completely stopped during a normal condition (not during the shift), it will be understood that the lube boost valve 72 can be replaced by a normal 2-position switching valve and an orifice can be disposed upstream of the second lubricating circuit 71 so that a small amount of lubricant is supplied to the clutches and brakes even during the normal condition.

What is claimed is:

1. A lubricating system for an automatic transmission, said automatic transmission having a first element which needs to be usually lubricated and a second element which needs to be lubricated during a shift, said lubricating system comprising:
   a first lubricating circuit usually supplying lubricant to the first transmission element; and
   a second lubricating circuit supplying lubricant to the second transmission element during the shift.

2. A lubricating system as claimed in claim 1, further comprising means for controlling the amount of lubricant supplied to the first and second elements through said first and second lubricating circuit, respectively.

3. A lubricating system as claimed in claim 2, wherein said control means usually controls the amount of lubricant supplied through said first lubricating circuit at a first predetermined amount, and controls the amount of lubricant supplied through said second lubricating circuit at a second predetermined amount during a shift.

4. A lubricating system as claimed in claim 1, wherein said second lubricating circuit includes a chamber which is disposed around the second element relative to shafts of the automatic transmission.

5. A lubricating system as claimed in claim 4, wherein the second element is lubricated by the lubricant which is supplied through the chamber and inwardly relative to the shaft of the automatic transmission.

6. A lubricating system as claimed in claim 4, wherein the chamber is defined by a casing of the automatic transmission and a member for fixing the second element to the casing.

7. A lubricating system as claimed in claim 6, wherein the member includes a plurality of holes which are formed at same intervals in the circular and axial directions relative to the shaft of the automatic transmission.

8. A lubricating system for an automatic transmission, the automatic transmission having a plurality of planetary gear sets and producing various speeds by selectively engaging friction elements, said lubricating system comprising:
   an oil pump pressurizing oil;
   a control valve assembly connected to said oil pump and including lubricant amount control means;
   a first lubricating circuit connected to said control valve assembly and supplying oil to the planetary gear sets during operation of the automatic transmission; and
   a second lubricating circuit connected to said control valve assembly and supplying oil to the friction elements during a shift.

9. A lubricating system for a friction element in an automatic transmission, said lubricating system comprising:
   an oil pump pressurizing oil;
   a control valve assembly connected to said oil pump; and
   a lubricating circuit connected to said control valve assembly and including a chamber defined by a casing of the automatic transmission and a member for fixing the friction element to the casing, said lubricating circuit supplying oil through the chamber to the friction element.

10. A lubricating system as claimed in claim 9, wherein the friction element fixing member includes a plurality of holes through which oil is supplied to the friction element.

* * * * *